United States Patent
Yoneda

(10) Patent No.: US 10,705,462 B2
(45) Date of Patent: Jul. 7, 2020

(54) IMAGE FORMING APPARATUS DETECTING STATUS OF MOTOR

(71) Applicant: KYOCERA Document Solutions Inc., Osaka (JP)

(72) Inventor: Shogo Yoneda, Osaka (JP)

(73) Assignee: Kyocera Document Solutions, Inc. (JP)

( * ) Notice: Subject to any disclaimer, the term of this patent is extended or adjusted under 35 U.S.C. 154(b) by 146 days.

(21) Appl. No.: 15/881,613

(22) Filed: Jan. 26, 2018

(65) Prior Publication Data

US 2018/0217544 A1    Aug. 2, 2018

(30) Foreign Application Priority Data

Jan. 30, 2017    (JP) ................... 2017-014155

(51) Int. Cl.
   *H02P 7/00*      (2016.01)
   *G03G 15/00*     (2006.01)
   *B65H 1/04*      (2006.01)

(52) U.S. Cl.
   CPC ............... *G03G 15/50* (2013.01); *B65H 1/04* (2013.01); *G03G 15/80* (2013.01); *H02P 7/0094* (2013.01); *G03G 15/6502* (2013.01); *G03G 15/6511* (2013.01)

(58) Field of Classification Search
   CPC .......... G03G 15/50; B65H 1/04; B65H 1/022; B65H 1/025; B65H 1/08; H02P 7/00
See application file for complete search history.

(56) References Cited

U.S. PATENT DOCUMENTS

| | | | | |
|---|---|---|---|---|
| 5,451,039 A | * | 9/1995 | Adachi ................... | B65H 3/44 271/147 |
| 8,333,375 B2 | * | 12/2012 | Nishikata ............... | B65H 1/266 271/126 |
| 8,641,036 B2 | * | 2/2014 | Nishikata ............... | B65H 1/266 271/127 |

FOREIGN PATENT DOCUMENTS

| | | | |
|---|---|---|---|
| JP | 56-007496 | | 1/1981 |
| JP | 3-46932 | * | 2/1991 |
| JP | 2001-042452 | | 2/2001 |
| JP | 2014-347296 | | 12/2002 |
| JP | 2004-345588 | * | 12/2004 |
| JP | 2008-17611 | | 1/2008 |
| JP | 2017-17800 | | 1/2017 |

OTHER PUBLICATIONS

Machine Translation of JP2004-345588. (Year: 2004).*

* cited by examiner

*Primary Examiner* — Thomas A Morrison

(57) ABSTRACT

A motor driving unit controls motor conducted current of a brushed DC motor on the basis of a motor control signal. A motor control unit provides the motor control signal to the motor driving unit and thereby controls the brushed DC motor. A brush noise detecting unit detects brush noises in conducted current of the brushed DC motor and outputs a brush noise detection signal. A speed determining unit determines a time interval of the brush noises and determines a rotation speed of the brushed DC motor on the basis of the time interval. Further, the motor control unit determines whether the brushed DC motor is in a lock status or not on the basis of the rotation speed in a period that the motor control signal is provided to the motor driving unit to cause the brushed DC motor to be in operation.

4 Claims, 3 Drawing Sheets

IMAGE FORMING APPARATUS DETECTING STATUS OF MOTOR

CROSS-REFERENCE TO RELATED APPLICATIONS

This application relates to and claims priority rights from Japanese Patent Application No. 2017-014155, filed on Jan. 30, 2017, the entire disclosures of which are hereby incorporated by reference herein.

BACKGROUND

1. Field of the Present Disclosure

The present disclosure relates to an image forming apparatus.

2. Description of the Related Art

In general, in an image forming apparatus such as a printer or a multi function peripheral, a DC (Direct Current) motor is used as a driving source for development device, a paper feeding and transporting system of a printing paper sheet or a document or the like.

An image forming apparatus includes a DC servo motor and detects an improper action of the motor on the basis of its motor conducted current.

Further, a printer includes a DC motor and detects a rotation speed of the DC motor using an encoder, and changes a duty of PWM (Pulse Width Modulation) control so as to make the detected rotation speed equal to a target value, and therefore, if the duty as a maximum value continues in a constant time, then it is determined that the DC motor is in a lock status.

However, in the aforementioned image processing apparatus, if a difference of a motor conducted current is small between in the lock status and in a steady state, the lock status may not be detected properly on the basis of the motor conducted current.

Further, in the aforementioned printer, a speed of the motor is controlled using a feedback control of the rotation speed of the motor, and therefore, an encoder is required to detect the rotation speed, and consequently a device cost is relatively high.

SUMMARY

An image forming apparatus according to an aspect of the present disclosure includes a brushed DC motor, a motor driving unit, a motor control unit, a brush noise detecting unit, and a speed determining unit. The motor driving unit is configured to control motor conducted current of the brushed DC motor on the basis of a motor control signal. The motor control unit is configured to provide the motor control signal to the motor driving unit and thereby control the brushed DC motor. The brush noise detecting unit is configured to detect brush noises in conducted current of the brushed DC motor and output a brush noise detection signal that indicates detection timings of the brush noises. The speed determining unit is configured to determine a time interval of the brush noises on the basis of the brush noise detection signal and determine a rotation speed of the brushed DC motor on the basis of the time interval. Further, the motor control unit determines whether the brushed DC motor is in a lock status or not on the basis of the rotation speed determined by the speed determining unit in a period that the motor control signal is provided to the motor driving unit to cause the brushed DC motor to be in operation.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
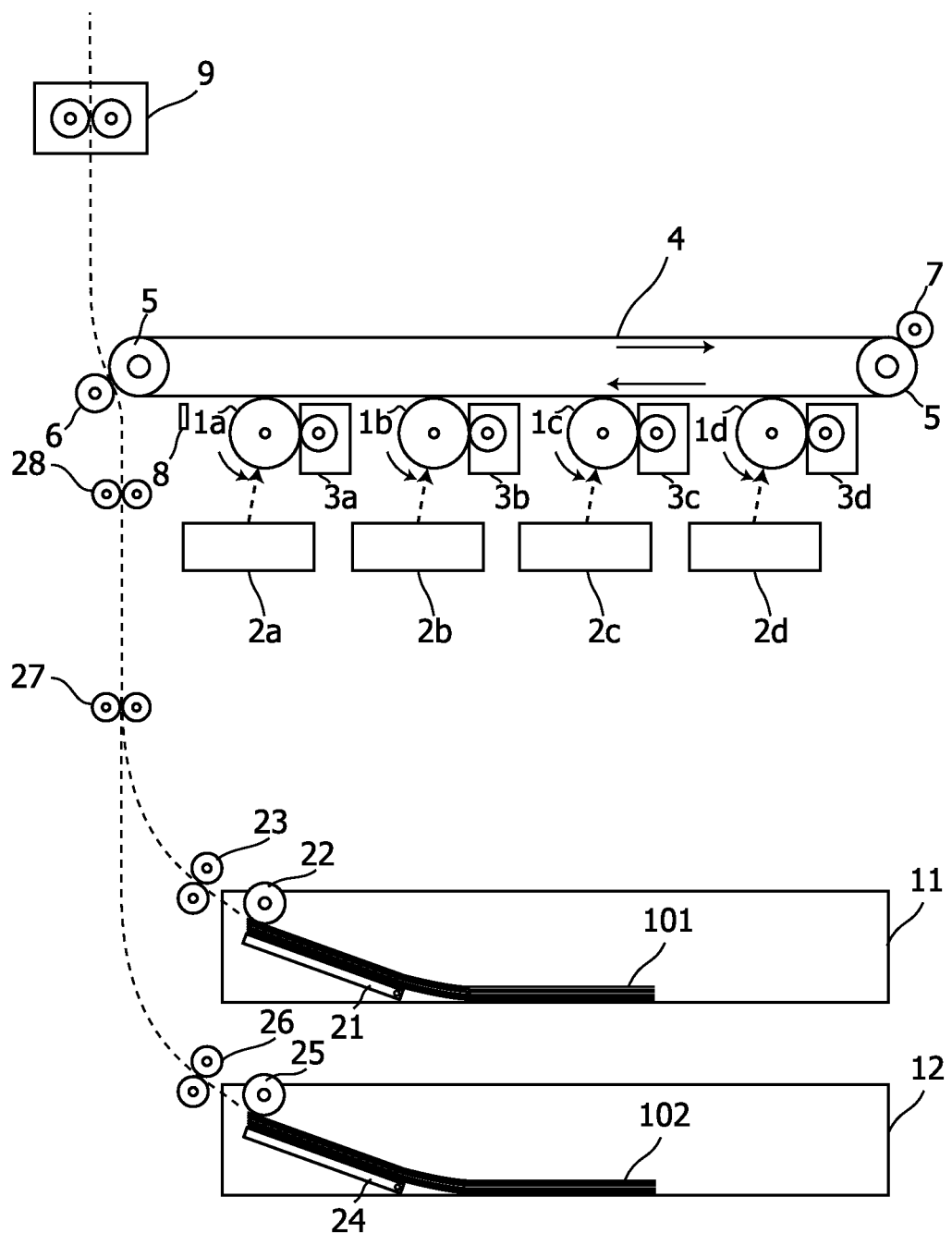
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus shown in FIG. 1 is an apparatus having a printing function such as a printer, a facsimile apparatus, a copier, or a multi function peripheral.

The image forming apparatus in this embodiment includes a tandem-type color development device. This color development device includes photoconductor drums 1a to 1d, exposure devices 2a to 2d, and development devices 3a to 3d. The photoconductor drums 1a to 1d are photoconductors of four colors: Cyan, Magenta, Yellow and Black.

The exposure devices 2a to 2d are devices that form electrostatic latent images by irradiating the photo conductor drums 1a to 1d with laser light, respectively. The laser light is scanned in a direction (a primary scanning direction) perpendicular to a rotation direction (a secondary scanning direction) of the photo conductor drum 1a, 1b, 1c or 1d. The exposure devices 2a to 2d include laser scanning units that include laser diodes as light sources of the laser light, optical elements (such as lens, mirror and polygon mirror) that guide the laser light to the photo conductor drums 1a to 1d, respectively.

Further, a charging unit, a cleaning device, a static electricity eliminator and the like are disposed in the periphery of each one of the photo conductor drums 1a to 1d. The cleaning device removes residual toner on each one of the photo conductor drums 1a to 1d after primary transfer. The static electricity eliminator eliminates static electricity of each one of the photo conductor drums 1a to 1d after primary transfer.

The development device 3a, 3b, 3c, or 3d includes a toner cartridge and a development unit. The toner cartridge contains toner of one of four colors: Cyan, Magenta, Yellow, and Black. The toner is supplied from a toner hopper in the toner cartridge to the development unit. The development unit causes the toner to adhere onto the photoconductor drum 1a, 1b, 1c, or 1d. The development device 3a, 3b, 3c, or 3d forms a toner image by causing the toner to adhere to an electrostatic latent image on the photoconductor drum 1a, 1b, 1c, or 1d.

The photoconductor drum 1a, the exposure device 2a and the development device 3a perform development of Magenta for an image to be printed. The photoconductor drum 1b, the exposure device 2b and the development device 3b perform development of Cyan for an image to be printed. The photoconductor drum 1c, the exposure device 2c and the development device 3c perform development of Yellow for an image to be printed. The photoconductor drum 1d, the exposure device 2d and the development device 3d perform development of Black for an image to be printed.

The intermediate transfer belt 4 is a loop-shaped image carrier (here an intermediate transfer member), and contacts the photoconductor drums 1a to 1d. Toner images on the photoconductor drums 1a to 1d are primarily transferred onto the intermediate transfer belt 4. The intermediate transfer belt 4 is hitched around driving rollers 5, and rotates by driving force of the driving rollers 5 towards the direction from the contact position with the photoconductor drum 1d to the contact position with the photoconductor drum 1a.

A transfer roller 6 causes a conveyed paper sheet (as mentioned below) to contact the transfer belt 4, and thereby secondarily transfers the toner image on the transfer belt 4 to the paper sheet. The paper sheet on which the toner image has been transferred is conveyed to a fuser 9, and consequently, the toner image is fixed on the paper sheet.

A roller 7 includes a cleaning brush, and removes residual toner on the intermediate transfer belt 4 by the cleaning brush contacting to the intermediate transfer belt after transferring the toner image to the paper sheet and/or after toner density calibration or toner gradation calibration.

A sensor 8 irradiates the intermediate transfer belt 4 with light, and detects its reflection light from a surface of the intermediate transfer belt 4 or a toner pattern on the intermediate transfer belt 4. For example, the sensor 8 is used in a calibration process of toner gradation.

Further, the image forming apparatus of this embodiment includes plural paper sheet cassettes 11 and 12.

The paper sheet cassettes 11 and 12 are capable of storing paper sheets 101 and 102, and push up the paper sheets 101 and 102 using lift plates 21 and 24 so as to cause the paper sheets 101 and 102 to contact with pickup rollers 22 and 25, respectively. The paper sheets 101 and 102 put on the paper sheet cassettes 11 and 12 are picked up to sheet feeding rollers 23 and 26 by the pickup rollers 22 and 25 sheet by sheet from the upper side, respectively. The sheet feeding rollers 23 and 26 are rollers that transport the paper sheets 101 and 102 sheet by sheet fed by the pickup rollers 22 and 25 from the paper sheet cassettes 11 and 12 onto a transportation path.

A transportation roller 27 is a transportation roller on a transportation path common to the paper sheets 101 and 102 transported from the paper sheet cassettes 11 and 12. A registration roller 28 temporarily stops the paper sheet in transportation, and at a second feeding timing, transports the paper sheet to a transfer position between the intermediate transfer belt 4 and the transfer roller 6.

The aforementioned photoconductor drums 1a to 1d, the aforementioned roller or the like is driven by a driving source such as a motor.

Figure 2:
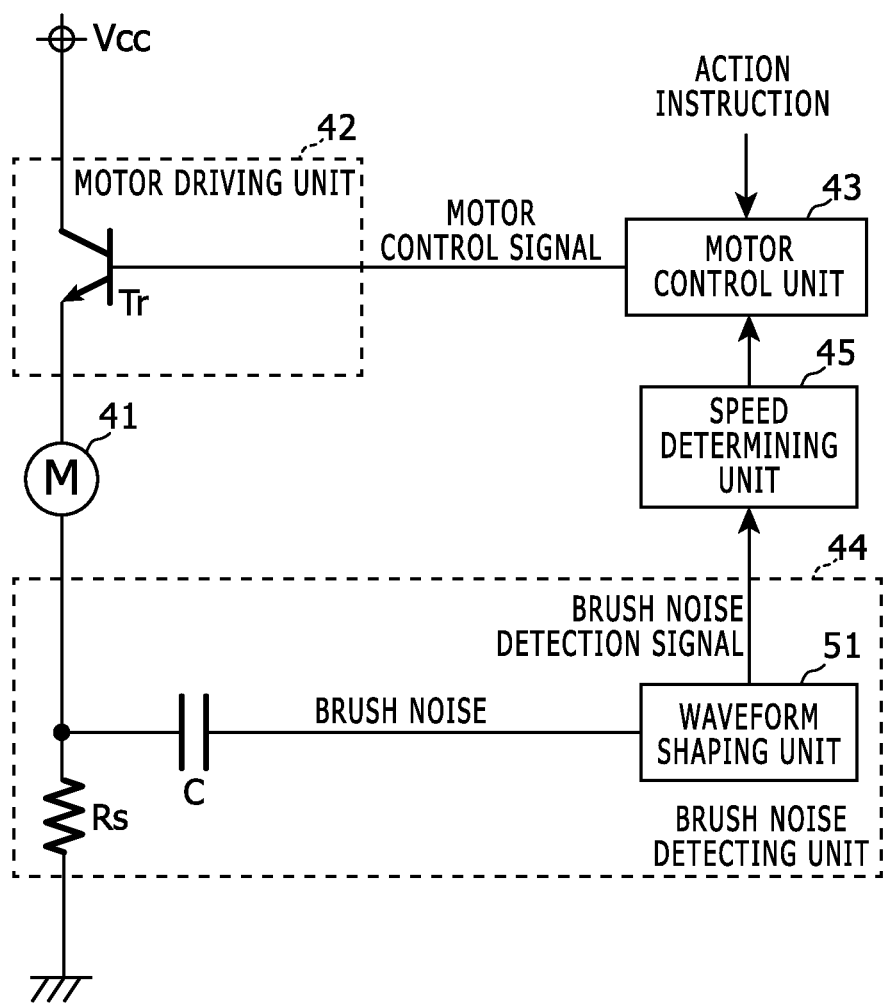
FIG. 2 shows a circuit diagram that indicates an example of a configuration of a motor control device that controls a motor as a driving source in the image forming apparatus shown in FIG. 1.

FIG. 2 shows a circuit diagram that indicates an example of a configuration of a motor control device that controls a motor as a driving source in the image forming apparatus shown in FIG. 1.

The motor control device shown in FIG. 2 is included by the image forming apparatus shown in FIG. 1, and controls a motor 41.

The motor 41 is a brushed DC motor build in the image forming apparatus. For example, the motor 41 is a driving source of a lift-up mechanism to lift up the paper sheet 101 or 102 stored in the paper sheet cassette 11 or 12. Alternatively, the motor 41 may be a driving source of another part such as the aforementioned roller.

For example, if a sensor detects that the lift plate 21 or 24 is lifted up to a predetermined position and this sensor is broken down, then no detection signals are obtained from the sensor and therefore even when the lift plate 21 or 24 reaches a limit position (for example, contacts to the housing or the like), the motor 41 continues to run and falls into a lock status. Therefore, means for detecting such a lock status is required for the aforementioned motor 41.

The motor driving unit 42 controls motor conducted current of the motor 41. Here the motor driving unit 42 controls the motor conducted current using a linear control with a transistor Tr on the basis of a motor control signal. It should be noted that the motor driving unit 42 may control the motor conducted current using a PWM control on the basis of a motor control signal.

The motor control unit 43 provides the motor control signal to the motor driving unit 42 and thereby controls the motor 41. The motor control unit 43 sets (a) turning on/off of rotation of the motor 41 and/or (b) a rotation speed of the motor 41, using the motor control signal.

The brush noise detecting unit 44 detects brush noises in conducted current of the motor 41, and outputs a brush noise detection signal that indicates detection timings of the brush noises.

In this embodiment, the brush noise detecting unit 44 includes a current sensing resistor Rs connected serially to the motor 41, a condenser C connected to an end of the current sensing resistor Rs, and a waveform shaping unit 51. The waveform shaping unit 51 (a) generates pulses corresponding to the brush noises that passed through the condenser C and (b) outputs the pulses as the brush noise detection signal. The condenser C cuts down a direct current component and a low frequency component, and consequently, a frequency component of the brush noises are selectively outputted to the waveform shaping unit 51.

Figure 3:
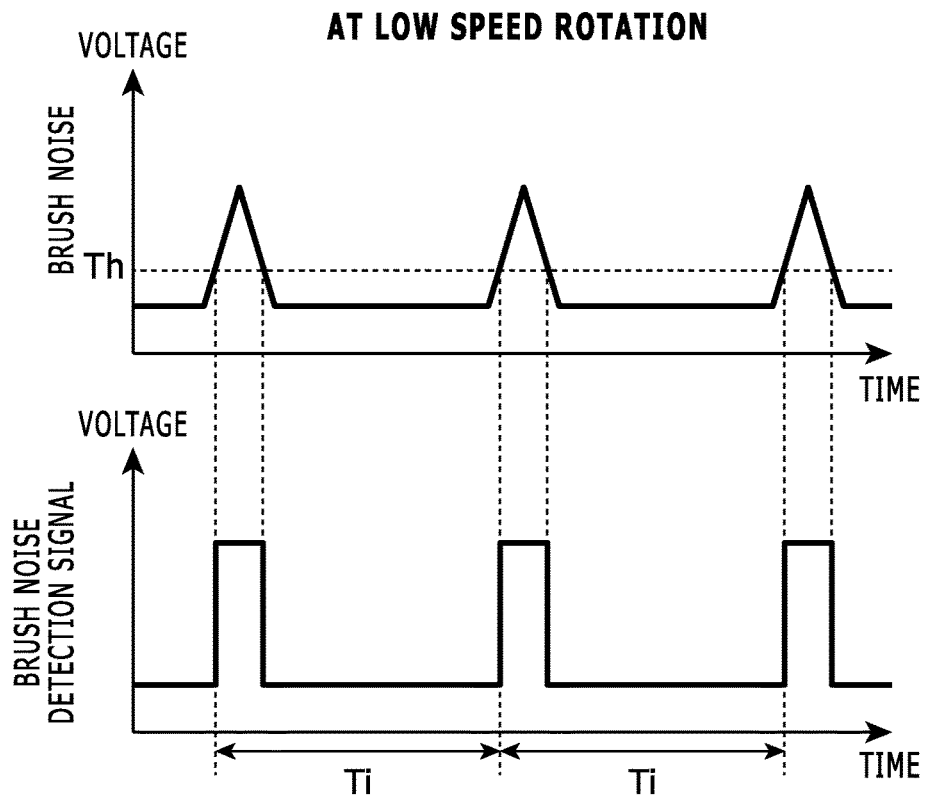
FIG. 3 shows a timing chart that explains brush noises detected by the motor control device shown in FIG. 2 and a brush noise detection signal.
Figure 3:
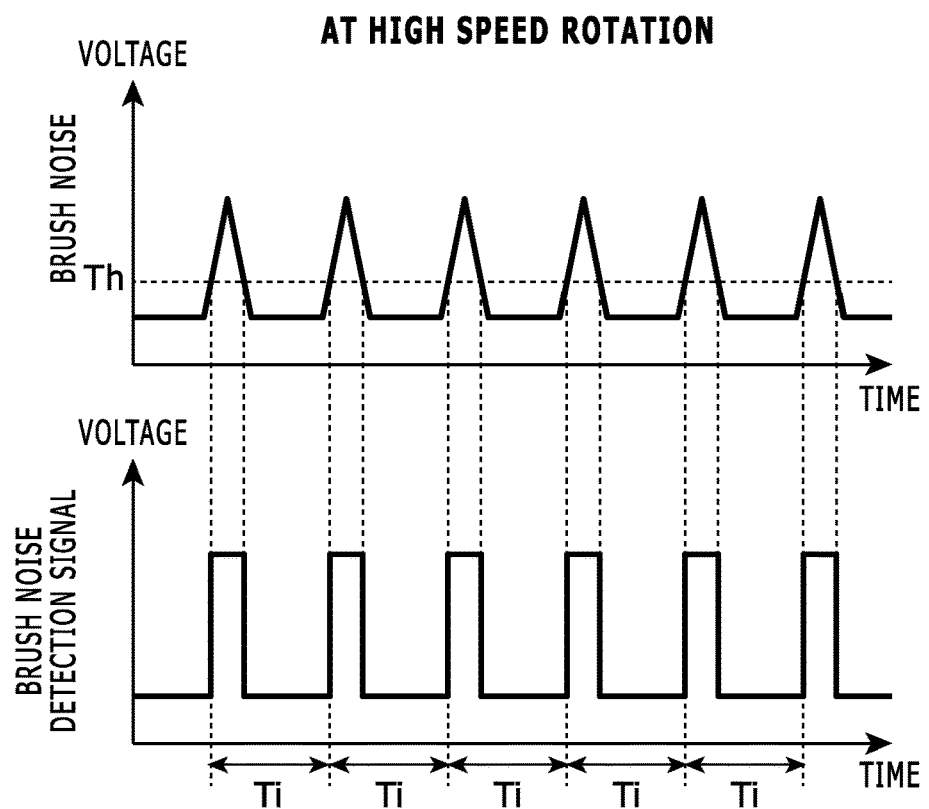

FIG. 3 shows a timing chart that explains brush noises detected by the motor control device shown in FIG. 2 and a brush noise detection signal.

For example, the waveform shaping unit 51 compares an output voltage of the condenser C with a reference voltage Th (e.g. using a comparator or the like); and sets a voltage of the brush noise detection signal as a predetermined high level if the output voltage of the condenser C is higher than the reference voltage Th, and otherwise sets a voltage of the brush noise detection signal as a predetermined low level. Consequently, rectangular pulses corresponding to the brush noises are generated as the brush noise detection signal.

The brush noise occurs when a contact condition between a brush and a commutator of the motor 41 is changed, and therefore, the brush noise occurs at a predetermined rotation angle of the motor 41. Therefore, as shown in FIG. 3, the higher the rotation speed of the motor 41 is, the shorter a time interval of the brush noises gets and consequently the shorter a time interval Ti of the pulses in the brush noise detection signal gets.

The speed determining unit 45 determines a time interval of the brush noises on the basis of the brush noise detection signal and determines a rotation speed of the brushed DC motor on the basis of the time interval. For example, if the pulses shown in FIG. 3 are generated by the waveform shaping unit 51, then the speed determining unit 45 measures a time interval Ti of these pulses, and determines a rotation speed of the brushed DC motor on the basis of the time interval Ti.

Further, the motor control unit 43 determines whether the motor 41 is in a lock status or not on the basis of the rotation speed determined by the speed determining unit 45 in a period that the motor control signal is provided to the motor driving unit 42 to cause the motor 41 to be in operation. The motor control unit 43 may perform rotation speed control of the motor 41 on the basis of the rotation speed determined by the speed determining unit 45.

For example, no brush noises (i.e. no pulses in the brush noise detection signal) are generated in the lock status, and therefore the speed determining unit 45 determines the rotation speed of the motor 41 as zero at a timing that an elapsing time from the last pulse detected in the brush noise detection signal exceeds a threshold value, and the motor control unit 43 determines that the motor 41 is in the lock status at a timing that the speed determining unit 45 determines the rotation speed as zero in a period that the motor control signal is provided to the motor driving unit 42 to cause the motor 41 to be in operation.

This threshold value may be a constant value or may be set on the basis of the aforementioned time interval Ti (e.g. twice of the time interval Ti at the last pulse).

For example, the aforementioned motor control unit 43 and the speed determining unit 45 are embodied as an ASIC (Application Specific Integrated Circuit) or the like.

The following part explains a behavior of the aforementioned image forming apparatus.

When performing a job such as printing, if required, an action instruction is provided from an unshown controller to the motor control unit 43, and the motor control unit 43 outputs a motor control signal according to the action instruction and thereby causes the motor driving unit 42 to rotate the motor 41.

When the motor 41 rotates, brush noises occur at time interval corresponding to its rotation speed. The brush noise detecting unit 44 detects the brush noise and outputs a brush noise detection signal in the aforementioned manner. The speed determining unit 45 determines a rotation speed of the motor 41 on the basis of the brush noise detection signal, and provides to the motor control unit 43 a rotation speed signal that indicates the determined rotation speed.

The motor control unit 43 keeps outputting the motor control signal and watching the rotation speed signal, and determines that the motor 41 is in a lock status if the rotation speed signal indicates zero as the rotation speed. For example, if it is determined that the motor 41 is in a lock status, then the motor control unit 43 forcibly stops the motor 41 using the motor control signal, and outputs an error notification to an unshown controller. This controller, for example, notifies a user of this lock status.

If the rotation speed signal does not indicate zero as the rotation speed, then the motor control unit 43 continues to output the motor control signal according to the action instruction until an action based on the action instruction is finished. Further, in a period that the motor 41 is not in operation in accordance with the motor control signal, even if the rotation speed signal indicates zero as the rotation speed, the motor control unit 43 does not perform the error notification nor the like.

In the aforementioned embodiment, the motor 41 is a brushed DC motor, and the motor driving unit 42 controls motor conducted current of the motor 41. The motor control unit 43 provides the motor control signal to the motor driving unit 42 and thereby controls the motor 41. The brush noise detecting unit 44 detects brush noises in conducted current of the motor 41, and outputs a brush noise detection signal that indicates timings of detecting the brush noises. The speed determining unit 45 determines a time interval of the brush noises on the basis of the brush noise detection signal and determines a rotation speed of the motor 41 on the basis of the time interval. Further, the motor control unit 43 determines whether the motor 41 is in a lock status or not on the basis of the rotation speed determined by the speed determining unit 45 in a period that the motor control signal is provided to the motor driving unit 42 to cause the motor 41 to be in operation.

Consequently, using brush noises that periodically occur with a period corresponding to a rotation speed of a DC motor, an inexpensive configuration with no encoders is enabled to properly detect a lock status of the DC motor.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
a brushed DC motor;
a motor driving unit configured to control motor conducted current of the brushed DC motor on the basis of a motor control signal;
a motor control unit configured to provide the motor control signal to the motor driving unit and thereby control the brushed DC motor;
a brush noise detecting unit configured to detect brush noises in conducted current of the brushed DC motor and output a brush noise detection signal that indicates detection timings of the brush noises; and
a speed determining unit configured to determine a time interval of the brush noises on the basis of the brush noise detection signal and determine a rotation speed of the brushed DC motor on the basis of the time interval;
wherein the motor control unit determines whether the brushed DC motor is in a lock status or not on the basis of the rotation speed determined by the speed determining unit in a period that the motor control signal is provided to the motor driving unit to cause the brushed DC motor to be in operation, wherein the brush noise detecting unit comprises a current sensing resistor connected serially to the brushed DC motor, a condenser connected to an end of the current sensing resistor, and a waveform shaping unit configured to (a) generate pulses corresponding to the brush noises that passed through the condenser and (b) output the pulses as the brush noise detection signal; and
the speed determining unit determines a time interval of the pulses and determines the rotation speed of the brushed DC motor on the basis of the time interval of the pulses.

2. The image forming apparatus according to claim 1, wherein the speed determining unit determines the rotation speed as zero at a timing that an elapsing time from the last pulse detected in the brush noise detection signal exceeds a threshold value; and
the motor control unit determines that the brushed DC motor is in a lock status at a timing that the speed determining unit determines the rotation speed as zero in a period that the motor control signal is provided to the motor driving unit to cause the brushed DC motor to be in operation.

3. The image forming apparatus according to claim 2, wherein the threshold value is set on the basis of the time interval.

4. The image forming apparatus according to claim 1, further comprising a paper sheet cassette capable of storing a paper sheet;
   wherein the brushed DC motor is a driving source of a lift-up mechanism to lift up the paper sheet stored in the paper sheet cassette.

\* \* \* \* \*